Oct. 26, 1965

E. C. THOMSON 3,214,594

PHOTOSENSITIVE APPARATUS INCLUDING LINEAR
COMPENSATION NETWORKS
Filed March 19, 1962

United States Patent Office 3,214,594
Patented Oct. 26, 1965

3,214,594
PHOTOSENSITIVE APPARATUS INCLUDING LINEAR COMPENSATION NETWORKS
Elihu C. Thomson, Wellesley, Mass., assignor to Electronics Corporation of America, Cambridge, Mass., a corporation of Massachusetts
Filed Mar. 19, 1962, Ser. No. 180,522
7 Claims. (Cl. 250—214)

This invention relates to measuring apparatus and more particularly to a novel and improved compensated variable measuring apparatus which provides an output as a linear function of the variable being measured.

Certain apparatus, such as those that employ photocells to provide a quantitative indication of the variable being sensed are subject to errors because of changes in environmental conditions. For example, in a photocell system where a light source is employed and a portion of the beam is interrupted by the variable being measured, a change in the amount of light falling on the photocell from any cause other than the variable being measured will affect the accuracy of the measurement. Such a change may occur as a result of a change in the line voltage applied to the light source or to a change in the light conditions in the surrounding environment. There are known arrangements which provide some compensation for such conditions but they impair the linearity of the measuring system output and make it difficult to utilize the output signal.

Accordingly, it is an object of this invention to provide in a measuring system an improved compensated circuit which provides a linear output as a function of the variable being measured independent of variations in environmental conditions.

A further object of the invention is to provide a novel and improved displacement measuring system which includes a photocell system that provides an output signal linearly proportional to the displacement of the variable so that that signal may be applied to a conventional servo or control system for providing the desired correction action.

In accordance with principles of the invention there is provided a measuring circuit which includes two energy responsive elements having similar electrical characteristics that change as a function of the energy impinging thereon. Both sensing elements are exposed to the same energy source, one being exposed in constant relation and the other being positioned so that the variable to be measured is interposed between the energy source and it. These sensing elements are connected in a series network across a stabilized signal source so that the signal occurring at the junction of the two elements is a function of the variable being measured. However this output voltage is not a linear function due to the nature of the network. A corrective network is connected to the junction of the sensing elements. This network includes a first element having fixed electrical characteristics and a second element whose corresponding characteristics vary as a function of the signal at the junction. By proper proportioning of the compensating elements the corrective network imposes a change in the output signal compensating for the nonlinearity introduced by the sensing network and produces a substantially linear output signal as a function of the variable being measured. In the preferred embodiment this correcting network is extended by the addition of a second correcting network of similar configuration which is biased so that the second correcting network becomes operative only at a predetedmined signal condition. The second network enables the correction imposed by the first correcting network to be extended and also provides an output circuit arrangement of greater flexibility so that the corrections may be applied for an increased variety of input conditions. Further, in the preferred embodiment isolation is provided between the correcting network and the sensing network so that the sensing network is not unduly loaded, thus avoiding possible resulting distortion. The invention provides a compensated measuring system which has particular advantages in sensing the displacement of a slack loop system for example, and which may be employed in a variety of control applications.

Other objects, features and advantages of the invention will be seen as the following description of a preferred embodiment thereof progresses in conjunction with the drawing, in which.

Figure 1:
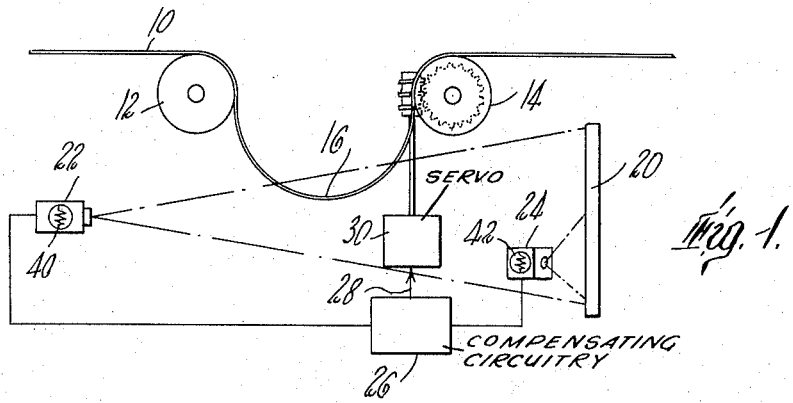
FIG. 1 is a diagrammatic view of a system constructed in accordance with principles of the invention employed for measuring the displacement of the slack loop in the conveyor system of a steel rolling mill.
Figure 2:
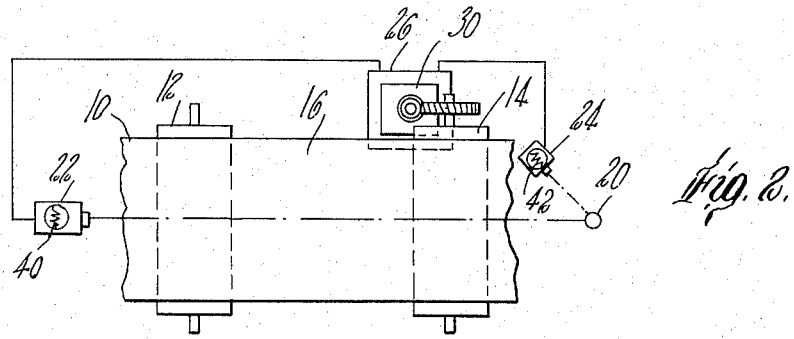
FIG. 2 is a top view of the apparatus shown in FIG. 1.

In the system illustrated in FIG. 1 a sheet of steel is conveyed between stages of a rolling mill system on rollers 12, 14. In order to provide accommodation between the slightly different speeds of the stages of operation a slack loop section 16 is provided in the conveyor system and the displacement of this slack loop is controlled by the speed of roller 14 and the following equipment. The displacement of this slack loop, however, must be fairly accurately controlled so that the loop does not disappear entirely nor become excessively large.

A photoelectric sensing system is used to control the slack loop. The sensing system utilizes an elongated light source 20 which is disposed vertically. This light source typically is a fluorescent light tube about four feet in length. On the opposite side of the slack loop from the light source is disposed a photocell unit generally indicated at 22 having optics of conventional nature which direct light from source 20 onto the sensitive element. It will be noted that the slack loop 16 blocks a portion of the light source 20 from the photocell unit 22. Variation in the vertical displacement of the slack loop accordingly varies the amount of light impinging on the photocell and affects the electrical resistance characteristics. Due to the fact that the amount of light impinging on the photocell 22 may vary from conditions other than the position of the slack loop, a compensating photocell unit 24 is disposed and directed for full exposure to a portion of the light source. This compensating photocell unit 24 is mounted so that it will sense any significant environmental condition the change of which might affect the output of photocell 22. The two signals from the photocells 22, 24 are combined in compensating circuitry 26 to provide an output signal 28 for application to a servo motor 30, which may be used, for example, to control the speed of the drive roll 14.

Figure 3:
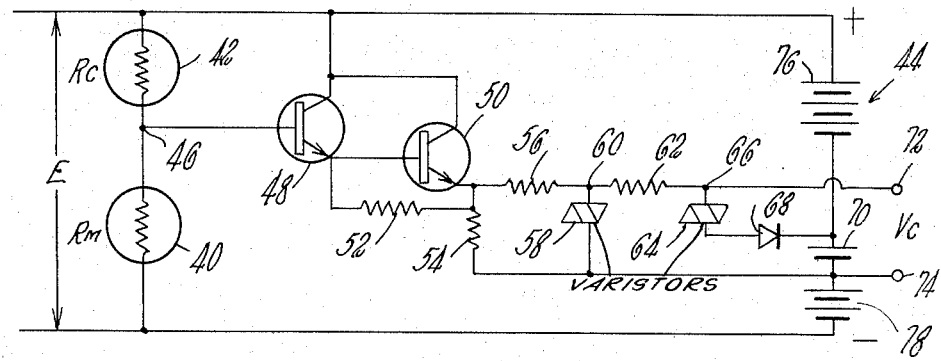
FIG. 3 is a schematic diagram of circuitry constructed in accordance with the principles of the invention.

The compensating and correcting circuit is shown in FIG. 3. This circuitry includes cadmium sulphide photocells 40, 42 which are mounted in the photocell units 22, 24 respectively. These two photocells are connected across a stabilized source 44 of fifty volts. As the two photocells are connected in series they form a voltage dividing network and at the junction 46 between them a signal is taken out for appliction to two transistor emitter-follower stages 48, 50. These two stages provide isolation between the sensing network and the correcting network so that variation in the characteristics of the correcting network will not affect the accuracy of the voltage dividing function of the sensing network. The photocells 40, 42, preferably are matched to have identical resistance and temperature coefficient characteristics so that influence of external environmental conditions may be minimized.

A correcting network is connected to the output of the emitter-follower stages and includes two voltage divider networks, each of which includes a fixed resistor and a varistor. The first network includes a fixed resistor 56 and a varistor 58 connected in series and defining a junction 60 at which the output voltage is taken. The second network includes resistor 62 and second varistor 64 also connected in series and having an output junction 66. The second network is connected to diode 68 so that it is biased by signal source 70 (a section of the main voltage source 44). The second voltage dividing network has an affect on the circuitry only when the output voltage rises above a value corresponding to that fixed by the clamping diode 68.

An output signal is provided at terminals 72, 74. The voltage source 44 includes two additional sections 76, 78. The reference terminal 74 is connected to the junction between battery sections 70 and 78.

The operation of the circuit may be understood from the following example. As indicated above cell 42 is exposed to a constant fraction of the light source 20, while cell 40 sees a varying amount of the light source dependent on the displacement of the slack loop 16. Assume that cell 42 is exposed to an amount of light equal to one half the amount seen by cell 40 with the lamp completely uncovered. Its resistance will then be double that of cell 40 and the voltage at junction 46 will be ⅓ of the total voltage E across the two cells in series. Since this condition corresponds to zero loop displacement, bias voltage 74 may be set at ⅓E so that the output voltage Vc is zero. The condition is shown graphically as point 1 in FIGURE 4.

Figure 4:
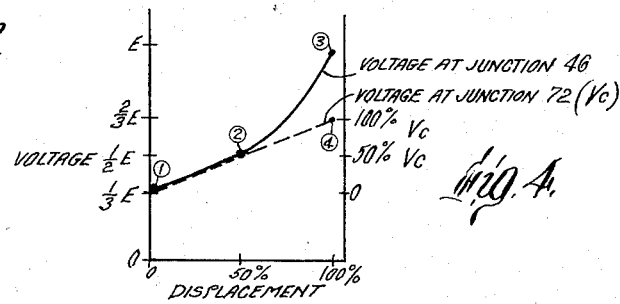
FIG. 4 is a graph illustrating operation of apparatus constructed in accordance with principles of the invention.

When the source is half-covered, corresponding to 50% displacement, cell 40 sees the same amount of light as cell 42 so the resistances are equal and the voltage at junction 46 is equal to ½ the total voltage E, shown as point 2 of FIGURE 4. Thus the initial 50% displacement causes a change of voltage of ⅙E.

Now when the source is completely covered, corresponding to 100% displacement, cell 40 sees no light, its resistance is infinite and the voltage at junction 46 is equal to E, shown as point 3 of FIGURE 4. Thus an additional 50% displacement causes a change at junction 46 of ½E or three times as much change as the first 50% displacement.

A linear relationship requires that the additional 50% displacement cause an additional rise in voltage at junction 46 of only an additional ⅙E which would bring the voltage at junction 46 to ⅔E, corresponding to point 4 in FIGURE 4. The required linearity is obtained by applying the voltage at 46, through isolating emitter follower transistors 48 and 50, to a non-linear voltage dividing network 56 and 58. The resistance of varistor 58 decreases as the voltage across it increases. Since one end of varistor 58 is tied to terminal 74 there is no voltage across it when junction 46 is at ⅓E and very little voltage across it when junction 46 is at ½E so that its resistance is high compared with that of resistor 56 causing very little voltage drop across resistor 56.

The voltage at junction 60 thus essentially follows the voltage at junction 46 up to that value. However, as junctions 46 and 60 further increase in voltage, the resistance of varistor 58 becomes lower, causing an appreciable drop in voltage across 56 and consequent division in voltage. Ideally this division is such that when the voltage at junction 46 reaches E, or point 3 in FIGURE 4, the voltage at junction 60 reaches point 4. With varistor 64 eliminated the voltage at terminal 72 is the same as junction 60. However, the resistance of varistor 58 in some cases does not change enough with increasing voltage to take care of the last steep part of the curve as it approaches point 3. Therefore an additional voltage-dividing compensator 62 and 64 may be brought into action by diode 68 at a voltage determined by bias voltage 70. The end result is that the output voltage Vc becomes an approximately linear function of displacement as indicated by the dotted line in FIGURE 4. The above described relationships are not exact but are simplifications for descriptive purposes.

Thus, the effect of the correcting network in conjunction with the non-linear output from the sensing network provides a substantially linear output voltage Vc as a function of the displacement of the slack loop. This voltage signal increases with increasing displacement so that with increasing displacement a larger signal is fed through the servo unit 30 to operate roll 14 for reducing the amount of the displacement of the slack loop.

The following are suitable types and values of components and voltages used in the circuitry shown in FIG. 3, which types and values are set forth in an illustrative and not in a limiting sense:

| | |
|---|---|
| Photocells 40 and 42 | RCA Type 7163. |
| Transistors 48 and 50 | TI Type 905. |
| Varistors 58 and 64 | Globar Type RV1. |
| Resistor 52 | 2700 ohms. |
| Resistor 54 | 10,000 ohms. |
| Resistor 56 | 3000 ohms. |
| Resistor 62 | 2000 ohms. |
| Source E | 50 volts. |
| Battery section 70 | 6 volts. |
| Battery section 76 | 31½ volts. |
| Battery section 78 | 12½ volts. |

This corrected compensated measuring network provides an output voltage that increases substantially linearly from zero volts (completely exposed source 20) to ten volts (fully obscured source 20). Through the use of the voltage dividing network principle there is no impairment of signal to noise ratio, both values being reduced proportionately. The output voltage may be amplified, if desired, prior to application to the servo unit 30 or other utilization devices to a full scale value of fifty volts, for example.

As will be seen, the invention provides a simple, inexpensive and reliable compensation circuitry which provides a high degree of linearity of output over a wide range of values of the variable being measured. The compensation is operative for changes in the lamp intensity and also changes in other environmental conditions where the cells have matched resistance and temperature coefficient characteristics. The correction network operates in inverse relation to the sensing network, providing compensation for the non-linearity produced by the compensation arrangement so that the two effects produce an output that is substantially linear with respect to the variable being measured, which is usable with standard servo systems. Isolation between the two networks is provided by the cascaded transistor emitter-follower stages and insures an accurate output from the compensated sensing network. Apparatus constructed in accordance with the principles of the invention may be employed in a variety of applications, of which the disclosed rolling mill control is typical.

While a preferred embodiment of the invention has been shown and described, it will be obvious to those skilled in the art that modifications may be made therein and therefore it is not intended that the invention be limited to the disclosed embodiment or to details thereof, and departures may be made therefrom within the spirit and scope of the invention as defined in the claims.

I claim:
1. Sensing apparatus comprising a light source,
   a sensing network having two photoresponsive components of the same type connected in series to define a junction therebetween, each said photoresponsive component having an electrical characteristic that varies directly as a function of radiation from said light source impinging thereon, one of said photoresponsive components being exposed directly to a fixed portion of said light source and the other photoresponsive component being arranged for exposure to said light source as a function of the variable being sensed by said apparatus, said sensing network providing an output voltage at the junction between said photoresponsive components as a nonlinear function of the variable being sensed, a first correcting network having an input terminal connected to said sensing network junction and an output terminal, said first correcting network including a compensating element whose electrical resistance varies as a function of the voltage from said sensing network, and a second correcting network having a input terminal connected to the output terminal of said first correcting network and an output terminal, said second correcting network including a fixed resistor, a varistor, and means to prevent conduction of said second correcting network over a predetermined range of output voltage, said first and second correcting networks being connected so that said networks produce a voltage at the output terminal of said second network in response to the voltage applied at the input terminal of said first network that is substantially linear with respect to the variable being sensed by said sensing apparatus.

2. Apparatus for sensing the position of an opaque member comprising an elongated tubular light source, a sensing network including first and second photoconductive elements, said first photoconductive element being exposed directly to a predetermined portion of said light source and said second photoconductive element being disposed so that the amount of light from said light source impinging on its is a function of the position of said opaque member, a stabilized voltage source, said first and second photoconductors being connected in series across said stabilized voltage source so that an output junction is defined between the two photoconductors, a correcting network including a fixed resistor and a varistor whose electrical resistance characteristic varies as a function of the voltage applied thereto, said fixed resistor and varistor being connected in series in voltage dividing relation and having an output terminal connected to the junction between said fixed resistor and said varistor so that the voltage at said output terminal varies linearly as a function of the position of said opaque member, and isolation means connected between said correcting network and said sensing network including a transistor connected in emitter-follower configuration.

3. The apparatus as claimed in claim 3 and further including a second correcting network connected between the first correcting network and said output terminal, said second correcting network including a second fixed resistor, a second varistor, and unidirectionally conductive means connected in series with a voltage source, said voltage source being connected to bias said unidirectionally conductive means to prevent conduction of said second correcting network over a predetermined range of output voltage.

4. The apparatus as claimed in claim 2 wherein said first photoconductor element is connected to the positive terminal of said stabilized voltage source and the second photoconductive element is connected to the negative terminal of said stabilized voltage source, and said voltage dividing network is arranged so that said fixed resistor is connected to the positive side thereof and said varistor is connected to the more negative side thereof.

5. Sensing apparatus comprising a sensing network including a first element having a fixed electrical resistance characteristic and a second element having an electrical resistance characteristic that varies as a function of the variable being sensed, said first and second elements being connected in series across a stabilized voltage source in voltage dividing relation, so that an output junction is defined between said first and second elements at which a voltage is provided which varies as a nonlinear function of the variable being sensed, a correcting network connected to said output junction including a fixed resistor and a varistor whose electrical resistance characteristic varies as a function of the voltage applied thereto, said fixed resistor and said varistor being connected in series in voltage dividing relation and having an output terminal connected to the junction between said fixed resistor and said varistor so that the voltage at said output terminal varies as a linear function of the variable being sensed, and a second correcting network connected between the first correcting network and said output terminal, said second correcting network including a second fixed resistor, a second varistor, and unidirectionally conductive means connected in series with a voltage source, said voltage source being connected to bias said unidirectionally conductive means to prevent conduction of said second correcting network over a predetermined range of output voltage.

6. Photoelectric sensing apparatus for sensing the position of an opaque member comprising an elongated tubular light source, a compensated sensing network including a stabilized D.C. voltage source, a first photoconductive element disposed so that the amount of light from said light source impinging on it is a linear function of the position of said opaque member, a second photoconductive element exposed directly to a predetermined portion of said light source, said first and second photoconductive elements being connected in series across said stabilized voltage source so that an output junction is defined between the two photoconductive elements at which a voltage is provided that varies as a non-linear function of the position of said opaque member, a correcting network connected to said output junction comprising a first voltage dividing network including a fixed resistor and a varistor whose electrical resistance characteristic varies as a function of the voltage applied thereto, said fixed resistor and varistor being connected in series, a second voltage dividing network connected to the junction between said first fixed resistor and said first varistor, said second voltage dividing network including a second fixed resistor, a second varistor, and a diode connected in series with a voltage source, said voltage source being connected to bias said diode to prevent conduction to said second voltage dividing network over a predetermined range of output voltage, an output terminal connected to the junction between said second fixed resistor and said second varistor, so that the voltage at said output terminal varies as a linear function of the position of said opaque member, and isolation means connected between said correcting network and said sensing network.

7. The photoelectric sensing apparatus as claimed in claim 6 wherein said isolation means includes first and second transistors connected in cascade relation,
   each said transistor being connected in emitter-follower configuration to provide impedance isolation between said sensing network and said correcting network.

References Cited by the Examiner
UNITED STATES PATENTS

| | | | |
|---|---|---|---|
| 2,294,376 | 9/42 | Belar | 250—209 |
| 2,753,464 | 7/56 | Stone | 250—219 |
| 2,939,361 | 6/60 | Hock | 250—209 X |
| 2,945,187 | 7/60 | McCollom | 250—209 X |
| 2,947,875 | 8/60 | Beck | 250—214 |
| 2,952,778 | 9/60 | Henderson | 250—208 |
| 2,954,475 | 9/60 | White | 250—214 X |
| 3,007,080 | 10/61 | Benson | 250—214 X |
| 3,028,499 | 4/62 | Farrall | 250—209 |
| 3,069,552 | 12/62 | Thomson | 250—214 |

RALPH G. NILSON, *Primary Examiner.*
ARCHIE R. BORCHELT, *Examiner.*